UNITED STATES PATENT OFFICE.

EMORY V. DONELSON, OF BALTIMORE, MARYLAND.

PROCESS OF TREATING RICE.

SPECIFICATION forming part of Letters Patent No. 400,835, dated April 2, 1889.

Application filed July 27, 1888. Serial No. 281,234. (No specimens.)

*To all whom it may concern:*

Be it known that I, EMORY V. DONELSON, a citizen of the United States, residing at Baltimore, in the State of Maryland, have invented certain new and useful Improvements in a Process for Treating Rice, of which the following is a specification.

This invention has for its object to obtain from the cereal rice the *Oryza sativa* of botanists, a product whose elements or constituents—starch, dextrine, and sugar—shall be developed into a soluble state or condition and have a form in which its virtues may be retained or preserved indefinitely, and which may be handled, shipped, or transported with the same facility of the natural grain.

My invention consists of a process as hereinafter described, and set forth in the claim.

The rice in its usual marketable condition is first subjected to a rubbing process, the object of which is to remove the hull or investing covering of cellular tissue. The grain is then subjected to the action of moisture and heat—such, for instance, as that produced by steam—to thoroughly develop the soluble starch, dextrine, and sugar without destroying the identity or form of the grains.

The temperature of the heat and the time during which the grain shall be exposed thereto must be regulated with a view to prevent the cooking process from reaching that point where loss of the soluble parts would ensue. When this step of the process has been completed, the cooked grains should be whole, but soft and plastic.

Any well-known means may be employed to subject the grain, as stated, to the action of moisture and heat. While the grains are hot, and immediately on the completion of the cooking process, they are treated to an application of cold water or a blast of cold air just sufficient to harden or toughen the outside of the grain, or, as it were, to case-harden it, and leave the inside in the soft and plastic condition before mentioned. This hardening or toughening of the exterior of the grain at this juncture is very important, as thereby the liability of loss of any part of the starchy ingredients while carrying the hot grain to the mill is avoided. The grains are then ready to be subjected to the treatment of rolls or mill, and the product is then dried.

When dried, this rice product of starch, dextrine, and sugar will be wholly soluble, and, besides being useful as an alimentary substance, will be a ready-prepared article for other uses. It will keep any length of time and may be readily handled.

Having described my invention, I claim—

The herein-described process for treating rice, consisting of first removing from rice in its usual marketable condition the covering of cellular tissue, then subjecting the grain to the action of moisture and heat to thoroughly develop the soluble starch, dextrine, and sugar without destroying the identity of the grains, then hardening or toughening the outside of the grain by cold applications, passing them through rolls or mill, and then drying, as set forth.

In testimony whereof I affix my signature in the presence of two witnesses.

EMORY V. DONELSON.

Witnesses:
CHAS. B. MANN,
JOHN E. MORRIS.